US009615279B2

(12) United States Patent
Davydov (10) Patent No.: US 9,615,279 B2
(45) Date of Patent: Apr. 4, 2017

(54) ENHANCED LISTEN-BEFORE-TALK (LBT) FOR UNLICENSED BAND OPERATION WITH CELL SPLITTING

(71) Applicant: Intel Corporation, Santa Clara, CA (US)

(72) Inventor: Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 14/740,563

(22) Filed: Jun. 16, 2015

(65) Prior Publication Data

US 2016/0219448 A1    Jul. 28, 2016

Related U.S. Application Data

(60) Provisional application No. 62/108,214, filed on Jan. 27, 2015.

(51) Int. Cl.
*H04W 24/08* (2009.01)
*H04W 72/04* (2009.01)
(Continued)

(52) U.S. Cl.
CPC ....... *H04W 24/08* (2013.01); *H04W 72/0453* (2013.01); *H04W 74/0816* (2013.01); *H04W 16/14* (2013.01); *H04W 84/042* (2013.01)

(58) Field of Classification Search
None
See application file for complete search history.

(56) References Cited

U.S. PATENT DOCUMENTS

2014/0341035 A1    11/2014  Bhushan et al.
2015/0043520 A1*    2/2015  Sun .................. H04L 5/001
                                                       370/330
(Continued)

OTHER PUBLICATIONS

"Broadband Radio Access Networks (BRAN); 5 GHz high performance RLAN; Harmonized EN covering the essential requirements of article 3.2 of the R&TTE Directive." ETSI EN 301 893 V1.7.1 (Jun. 2012). Harmonized European Standard. 90 pages.

(Continued)

*Primary Examiner* — Hong Cho
(74) *Attorney, Agent, or Firm* — Eschweiler & Potashnik, LLC (57) ABSTRACT

Techniques of enhanced listen-before-talk (LBT) at an Evolved NodeB (eNB) are discussed. An example apparatus within an eNB implementing such techniques comprises a receiver circuit, processor, and transmitter circuit. The receiver circuit is configured to receive a set of signals over a selected frequency band. The processor is configured to determine a subset of the set via an energy detection metric; determine, for each signal of the subset, whether that signal comprises one of a plurality of Long Term Evolution (LTE) reference signals (RSs); and implement a back-off procedure in response to a determination that at least one signal of the subset does not comprise one of the plurality of LTE RSs. The transmitter is configured to transmit a transmission comprising a first RS of the plurality of LTE RSs in response to a determination that each signal of the subset comprises one of the plurality of LTE RSs.

25 Claims, 7 Drawing Sheets

(51) Int. Cl.
  *H04W 74/08*   (2009.01)
  *H04W 84/04*   (2009.01)
  *H04W 16/14*   (2009.01)

(56) References Cited

U.S. PATENT DOCUMENTS

| | | | | |
|---|---|---|---|---|
| 2015/0271847 A1* | 9/2015 | Luon | ................... | H04W 74/002 |
| | | | | 370/329 |
| 2015/0296508 A1* | 10/2015 | Fann | ................. | H04W 72/0446 |
| | | | | 370/329 |
| 2016/0309334 A1* | 10/2016 | Bhorkarn | .............. | H04W 16/14 |

OTHER PUBLICATIONS

"Carrier selection and other coexistence methods." 3GPP TS RAN WG1 Meeting #79, San Francisco, USA, Nov. 17-21, 2014. R1-144901. 7 pages.

"Part 11: Wireless LAN Medium Access Control (MAC) and Physical Layer (PHY) Specifications." IEEE Standard for Information technology—Telecommunications and Information exchange between systems Local and metropolitan area networks—Specific requirements. IEEE Computer Society, IEEE Std. 802.11-2012. Mar. 29, 2012. New York, NY. 2,793 pages.

International Search Report and the Written Opinion of the International Searching Authority dated Feb. 17, 2016 Application No. PCT/US2015/062427.

Ericsson et al., "Study on Licensed-Assisted Access using LTE", 3GPP TSG RAN Meeting #64, Sophia Antipolis, France, Jun. 10-13, 2014, 7 pages.

* cited by examiner

ENHANCED LISTEN-BEFORE-TALK (LBT) FOR UNLICENSED BAND OPERATION WITH CELL SPLITTING

REFERENCE TO RELATED APPLICATIONS

This application claims the benefit of U.S. Provisional Application No. 62/108,214 filed Jan. 27, 2015, entitled "ENHANCED LBT FOR LTE-U WITH CELL SPLITTING", the contents of which are herein incorporated by reference in their entirety.

FIELD

The present disclosure relates to enhancements to listen-before-talk (LBT) procedures for unlicensed band operation of a mobile network.

BACKGROUND

Demand for wireless broadband data is increasing. The unlicensed spectrum is a potential tool considered by cellular operators to augment their service offerings. In order to utilize the unlicensed spectrum in Long Term Evolution-Advanced (LTE-A), a new study item proposal entitled "Study on Licensed-Assisted Access using LTE" (or LTE in unlicensed band—LTE-U) was approved by the 3rd Generation Partnership Project (3GPP) for Release version 13 (Rel-13). The idea behind LTE-U (or Licensed Assisted Access) is to extend the LTE system into the unlicensed frequency deployments, thus enabling operators and vendors to maximally leverage the existing or planned investments in LTE hardware in the radio and core network.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

Figure 1:
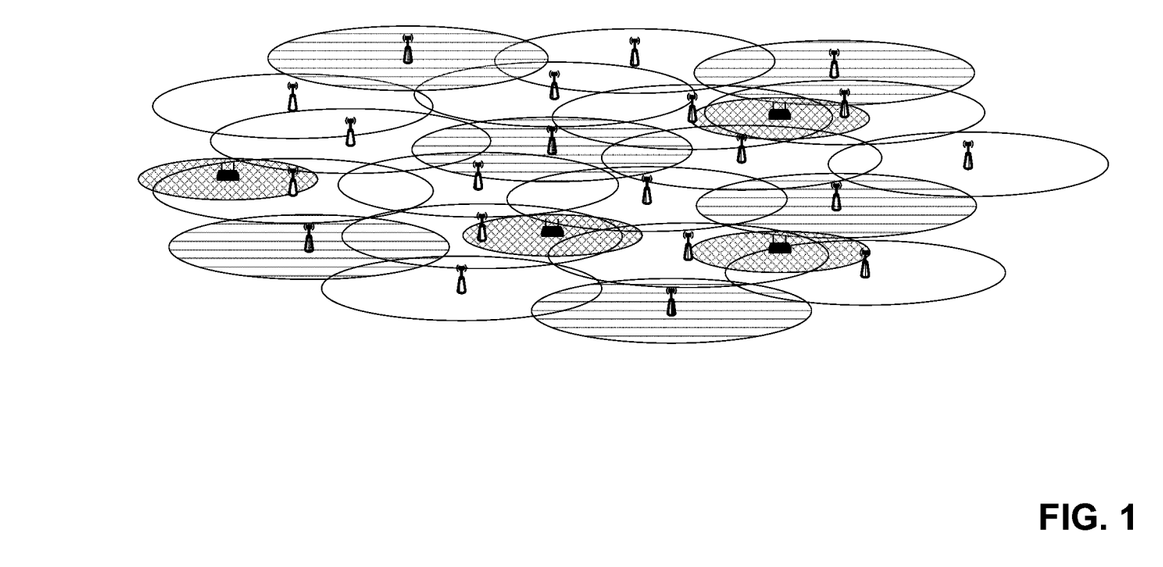
FIG. 1 is an illustration of an example scenario wherein LBT based solely on energy detection is employed by a plurality eNBs located near Wi-Fi APs and one another.

Embodiments described herein can facilitate enhanced listen-before-talk (LBT) techniques for LTE operation in unlicensed frequency bands. Due to the unlicensed nature of the frequency spectrum proposed for LTE-U, one of the main objectives of the LTE-U is to design and study LTE co-existence mechanism with other technologies such as Wi-Fi that operates in the same frequency band. For that purpose, the "listen-before-talk" (LBT) scheme relying on energy detection and back-off is considered as one of the main approaches to determine whether a selected frequency channel is or is not occupied by a transmission. However, the drawback of this approach is that energy detection alone cannot classify the source of the transmission. In other words, an LTE evolved node B (eNB) would not be able to determine whether the transmission is coming from a Wi-Fi access point (AP) or an LTE eNB. Accordingly, when an LTE eNB starts a transmission, nearby eNBs are likely to back-off from any transmission because the channel would be generally marked as occupied based on the energy detection process. FIG. 1 illustrates an example scenario wherein LBT based solely on energy detection is employed by a plurality eNBs located near Wi-Fi APs and one another. In FIG. 1 (and FIG. 2, discussed below), active Wi-Fi APs are represented by smaller ovals with crosshatching, such as Wi-Fi AP 110, transmitting eNBs are represented by larger ovals with horizontal hatching, such as transmitting eNB 120, and non-transmitting eNBs are represented by larger ovals with no hatching, such as non-transmitting eNB 130. As can be seen in FIG. 1, a large fraction of a group of LTE eNBs will not be transmitting signals even when a channel is free from Wi-Fi transmission and occupied by only by LTE signals, because these LTE signals will be detected as occupying the channel via the energy detection process. Accordingly, a cell splitting gain and frequency reuse process of an LTE system implementing a conventional LBT procedure does not operate optimally in the unlicensed spectrum.

Figure 2:
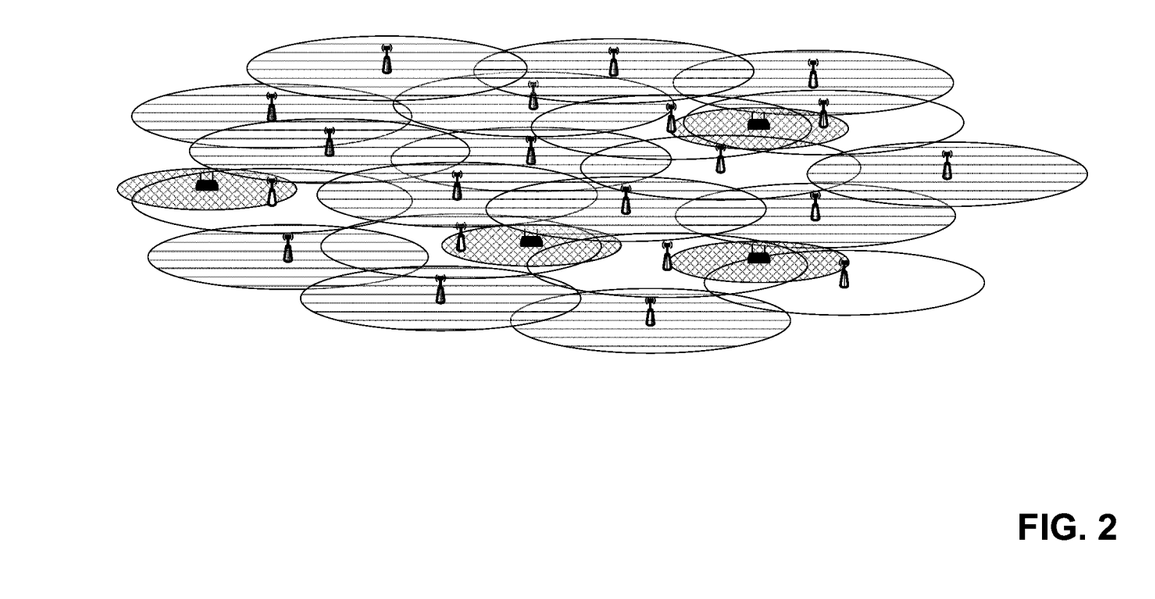
FIG. 2 is an illustration of the same arrangement of LTE eNBs and Wi-Fi APs as in FIG. 1, but with LTE eNBs implementing enhanced LBT techniques according to various aspects described herein.

While back-off of LTE eNB transmission is reasonable when a neighboring Wi-Fi AP is active, back-off is not needed when a neighboring LTE eNB is active. Given that LTE is robust to interference from neighboring eNBs, embodiments described herein can implement enhanced LBT techniques that can determine whether neighboring transmissions necessitate back-off procedures. These enhanced LBT techniques can leverage the robustness of LTE systems to improve the performance via cell splitting gain. FIG. 2 illustrates the same arrangement of LTE eNBs and Wi-Fi APs as in FIG. 1, but with LTE eNBs implementing enhanced LBT techniques according to various aspects described herein. As can be seen in FIG. 2, only the eNBs that have detected energy from Wi-Fi signals back-off their transmissions.

In various embodiments disclosed herein, a reference signal (RS) can be transmitted as part of an LTE transmission, and other eNBs receiving the transmission can identify the transmission as an LTE transmission on that basis, and therefore need not implement a back-off procedure. In various aspects, the RS can be transmitted at the beginning of the LTE transmission. In some embodiment, the RS need not be aligned with a sub-frame boundary. The transmission of the RS from a first LTE eNB (e.g., at or near the beginning of the LTE transmission, etc.) and the detection at a second LTE eNB can be used by the second LTE eNB to classify whether the frequency band was occupied by an LTE eNB or by non-LTE technology, such as Wi-Fi, which would require enabling or disabling of a co-existence mechanism such as back-off of the second LTE eNB. If the frequency band is occupied by Wi-Fi, the second LTE eNB can back-off its transmission to avoid interference with the Wi-Fi receiver; however, if the frequency band is occupied by an LTE eNB (e.g., the first eNB), the second eNB can transmit a signal to increase the frequency reuse and cell splitting gain.

Conventional techniques for addressing this issue relied on detection of Wi-Fi signals, for example, short training field or RTS/CTS (request to send/clear to send). This approach required implementation of a Wi-Fi receiver at a LTE eNB, which is a complex approach. Additionally, this approach fails to identify non-Wi-Fi signals operating in the same frequency band, for example, transmissions from eNBs of other operators. In various embodiments discussed herein, the contents of received LTE signals can be used to determine whether an LTE eNB may transmit.

Figure 3:
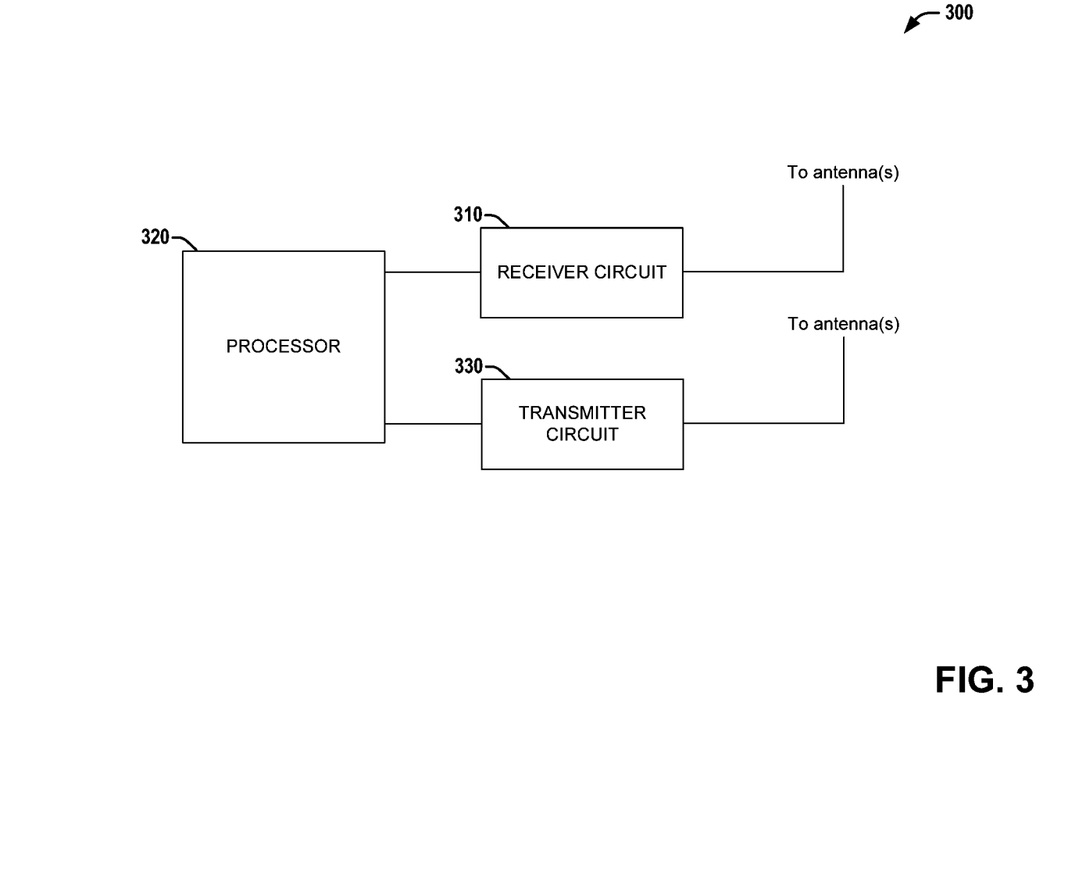
FIG. 3 is a block diagram of a system that facilitates enhanced listen-before-talk (LBT) operation at an Evolved NodeB (eNB) operating in a selected (e.g., unlicensed) frequency band according to various aspects described herein.

Referring to FIG. 3, illustrated is a block diagram of a system 300 that facilitates enhanced listen-before-talk (LBT) operation at an Evolved NodeB (eNB) operating in a selected (e.g., unlicensed) frequency band according to various aspects described herein. System 300 can include a receiver circuit 310, a processor 320, and a transmitter circuit 330. Each of the receiver circuit 310 and the transmitter circuit 330 are configured to be coupled to one or more antennas, which can be the same or different antenna (s). In aspects, the receiver circuit 310 and transmitter circuit 330 can have one or more components in common, and both can be included within a transceiver circuit, while in other aspects they are not. In various aspects, system 300 can be included within an Evolved Universal Terrestrial Radio Access Network (E-UTRAN) Node B (Evolved NodeB, eNodeB, or eNB).

Receiver circuit 310 can receive signals that are transmitted over a selected (e.g., unlicensed) frequency band. If receiver circuit 310 does not receive any detectable signals, LBT procedures need not be implemented, and transmitter circuit 330 can transmit a transmission as described herein (e.g., with a selected LTE RS at the beginning of the transmission, etc.).

If one or more signals are detected, processor 320 can apply an energy detection metric to determine, for each detected signal, whether the signal is sufficiently strong that potential interference may result during simultaneous transmission. The energy detection metric can involve processor 320 determining an energy of each detected signal (e.g., as measured by receiver 310), and processor 320 comparing that energy to a threshold energy. Each signal with an energy greater than the threshold energy can be determined by the processor 320 to be sufficiently strong.

For each sufficiently strong signal (e.g., each signal with energy greater than the threshold energy, etc.), processor 320 can determine whether that signal comprises an LTE RS of a set of predetermined LTE RSs. The set of predetermined LTE RSs can be received by receiver circuit 310 as configuration information and can be stored in a memory associated with system 300.

If processor 320 determines that there are no received signals of sufficient strength (e.g., none with energy greater than the threshold energy, etc.), transmitter circuit 330 can transmit a transmission as described herein (e.g., with a selected LTE RS at the beginning of the transmission, etc.), similarly to the situation wherein no signals are detected.

In various aspects, processor 320 can determine whether that signal comprises the LTE RS by analyzing the first transmitted symbol of that signal. The set of predetermined LTE RSs can comprise RSs that are or are based on any of a variety of LTE RSs or modified forms of conventional LTE RSs. For example, the set of predetermined LTE RSs can comprise one or more of a primary synchronization signal (PSS), a secondary synchronization signal (SSS), a cell specific reference signal (CRS), a channel state information reference signal (CSI-RS), an uplink demodulation reference signal (Uplink DM-RS), or a modified form of a conventional LTE RSs.

In embodiments wherein the set of predetermined LTE RSs comprise modified forms of LTE RSs, examples of such modified forms can comprise modified PSS or SSS signals. In a first example, a modified set of PSS signals can be used, based on an alternative Zadoff-Chu root sequence than conventionally employed for PSS signals. As a second example, one or more PSS signal(s) and/or SSS signal(s) based on an inverse frequency mapping can be employed. In a third example, the set of predetermined LTE RSs can comprise one or more complex conjugated SSS signals. Additional modified forms of conventional LTE RSs can be employed in various embodiments.

Additionally or alternatively, the set of LTE RSs can comprise RSs based on cell identities, for example, a signal from an eNB can comprise a RS based on a cell identity of the eNB transmitting that signal.

In some embodiments, the set of predetermined LTE RSs can comprise a set of predetermined LTE RSs assigned to or associated with an operator of a 3GPP network associated with system 300 (e.g., the network that comprises the eNB comprising system 300). For example, in a first embodiment (e.g., associated with a first 3GPP network), a first subset of all PSS and SSS signal can be employed as the set of predetermined LTE RSs for the first embodiment; while in a second embodiment (e.g., associated with a second 3GPP network), a second subset of all PSS and SSS signal can be employed as the set of predetermined LTE RSs for the second embodiment, with potential additional subsets for additional embodiments associated with additional networks. In embodiments wherein sets of LTE RSs are associated with network operators, processor 320 can determine whether a signal comprises one of the set of predetermined LTE RSs by determining whether the signal comprises an LTE RS (or an LTE RS of a set of LTE RSs employed a plurality of network operators), and if so, further determining whether that LTE RS is associated with the operator associated with system 300.

If at least one sufficiently strong signal (e.g., having an energy greater than the threshold energy, etc.) does not comprise an LTE RS of the set of predetermined LTE RSs, processor 320 can implement a back-off procedure to avoid interfering with that at least one sufficiently strong signal. This situation can arise when the at least one sufficiently strong signal comprises a Wi-Fi or other non-3GPP signal, or, in aspects, when the at least one sufficiently strong signal comprises a 3GPP signal from another network operating in the same selected (e.g., unlicensed) frequency band. In accordance with an example back-off procedure, receiver 310 can monitor the selected frequency band, and processor 320 can delay transmission by transmitter circuit 330 until the frequency band is no longer occupied by a sufficiently strong signal that does not comprise an LTE RS of the set of predetermined LTE RSs (e.g., through continued monitoring and analysis as described herein), and can additionally delay transmission by a randomly selected period of time to reduce the likelihood of simultaneous initiation of transmission.

However, if each sufficiently strong signal (e.g., based on comparison with the energy threshold, etc.) comprises an LTE RS of the set of predetermined LTE RSs, transmitter circuit 330 can transmit a transmission, as the only other detected signals of sufficient strength are received from 3GPP eNBs that are robust to interference from system 300, and additional transmission by system 300 can improve performance via cell splitting gain. Transmitter circuit 330 can transmit the transmission comprising a selected RS of the set of predetermined LTE RSs (e.g., in the first symbol of the transmission, etc.). In this way, neighboring eNBs comprising embodiments as described herein can also determine that simultaneous transmission is possible, unless those eNBs detect additional signals of sufficient strength such that do not comprise LTE RSs of the set of predetermined LTE RSs. Upon a determination that transmitter circuit 330 can transmit the transmission (e.g., because if there are any detected signals of sufficient strength, each comprises an LTE RS of the set of predetermined LTE RSs, potentially after a random delay from a back-off procedure, etc.), transmitter can begin the transmission (e.g., by transmitting the selected RS of the set of predetermined LTE RSs, etc.) even if it would not be aligned with a subframe boundary. In this manner, multiple eNBs beginning transmissions at similar times can be reduced, as can the potential for the frequency band to be occupied again by another non-LTE transmission, further delaying the transmission.

Figure 4:
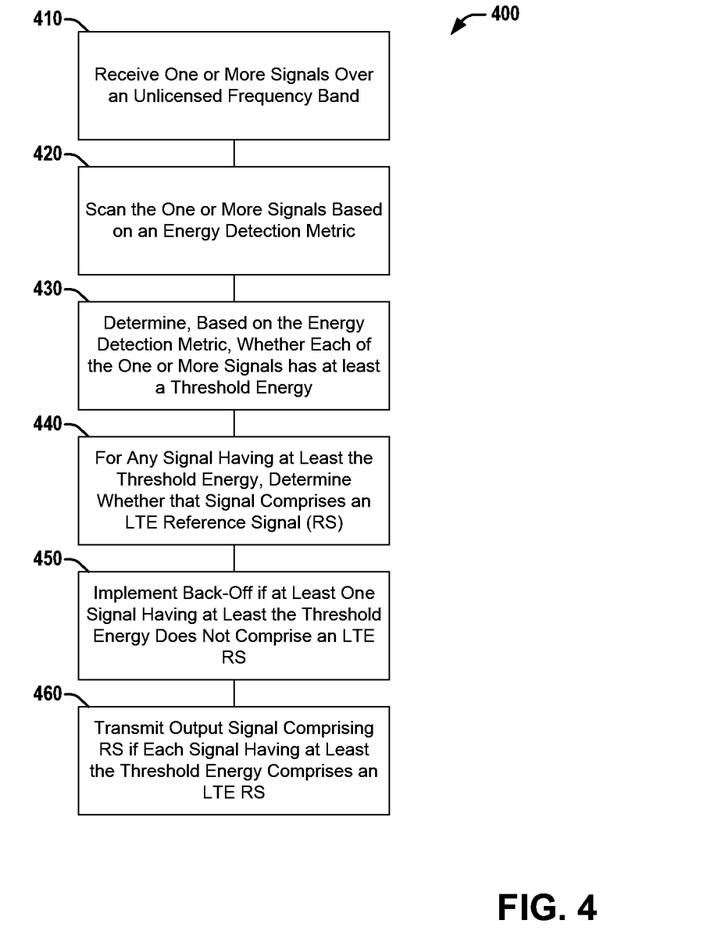
FIG. 4 is a flow diagram of a method that facilitates enhanced listen-before-talk (LBT) operation at an Evolved NodeB (eNB) operating in a selected (e.g., unlicensed) frequency band according to various aspects described herein.

Referring to FIG. 4, illustrated is a flow diagram of a method 400 that facilitates enhanced listen-before-talk (LBT) operation at an Evolved NodeB (eNB) operating in a selected (e.g., unlicensed) frequency band according to various aspects described herein. In various aspects, method 400 can be implemented at an eNB, for example, by executing machine-readable instructions that cause the eNB to perform some or all of the acts described in connection with method 400. Method 400 can include, at 410, receiving one or more signals over a selected (e.g., unlicensed) frequency band. At 420, the one or more received signals can be scanned based on an energy detection metric, and at 430, a determination can be made for each received signal, based on the energy detection metric, as to whether that signal has at least a threshold energy. For each signal having at least the threshold energy, at 440, a determination can be made as to whether that signal comprises (e.g., in its first symbol, etc.) an LTE RS of a set of predetermined LTE RSs as described herein. If there is at least one signal with at least the threshold energy that does not comprise an LTE RS of the set of predetermined LTE RSs (e.g., a Wi-Fi signal, an LTE signal from a network of another operator, etc.), at 450, a back-off procedure can be implemented, such as the example back-off procedure described herein. However, at 460, if each signal having at least the threshold energy comprises an LTE RS of the set of predetermined LTE RSs (e.g., because there are no signals with at least the threshold energy, or because there are one or more with each comprising such an RS), then an output signal can be transmitted comprising a selected RS of the set of predetermined LTE RSs.

Figure 5:
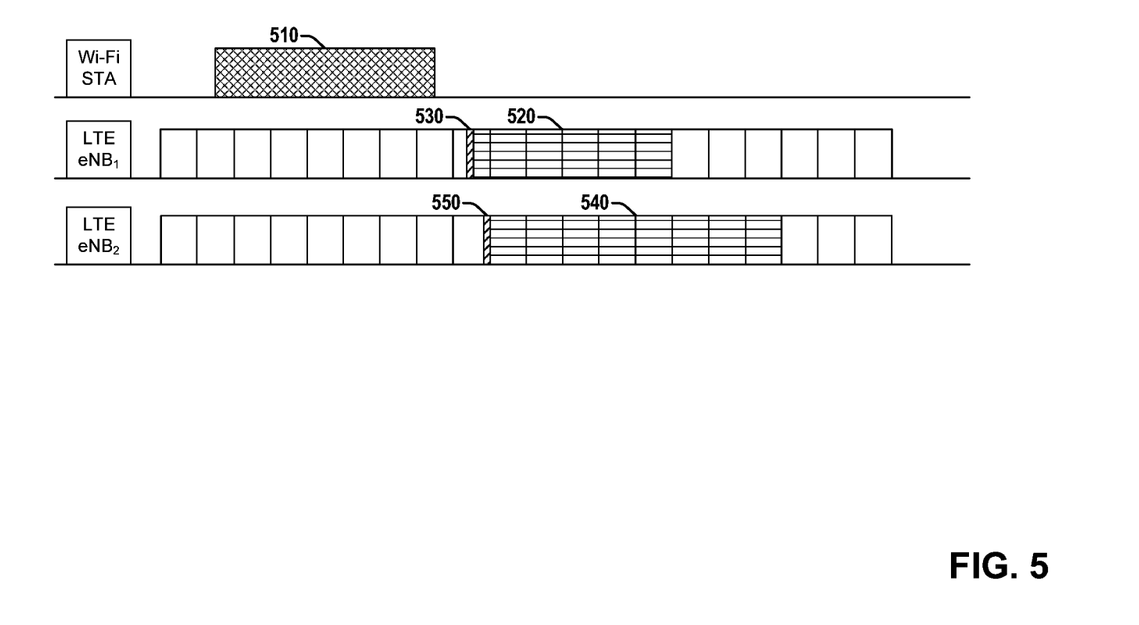
FIG. 5 is an example timing diagram of a network operation scenario with one Wi-Fi AP and two LTE eNBs according to various aspects described herein.

As discussed above, in various embodiments, a RS (e.g., of a set of predetermined LTE RSs) can be transmitted at or near the beginning of an LTE transmission. In various aspects, the RS need not be aligned with a sub-frame boundary. As discussed, adding a RS to a LTE transmission in accordance with aspects described herein can facilitate classification of a transmission source (e.g., as LTE or Wi-Fi) by a LTE eNB. The classification can be used to determine whether a LTE eNB needs to back-off from a transmission. FIG. 5 illustrates an example timing diagram of a network operation scenario with one Wi-Fi AP and two LTE eNBs according to various aspects described herein. Initially, as shown at 510, Wi-Fi AP transmission occupies a channel, during which time the two LTE eNBs, $eNB_1$ and $eNB_2$, back off any transmission after each determines, via energy detection, that the channel is busy with a transmission that does not comprise an LTE RS (e.g., in a first symbol, etc.). Once the channel is released by the Wi-Fi AP, the $eNB_1$ starts a transmission 520 by sending a RS 530 in the beginning (not aligned with a subframe boundary in this example). The $eNB_2$ detects that the channel is occupied by an LTE transmission by detecting the RS sent by the $eNB_1$, and starts its transmission 540 with a RS 550 in the beginning, thus providing cell splitting gain.

Figure 6:
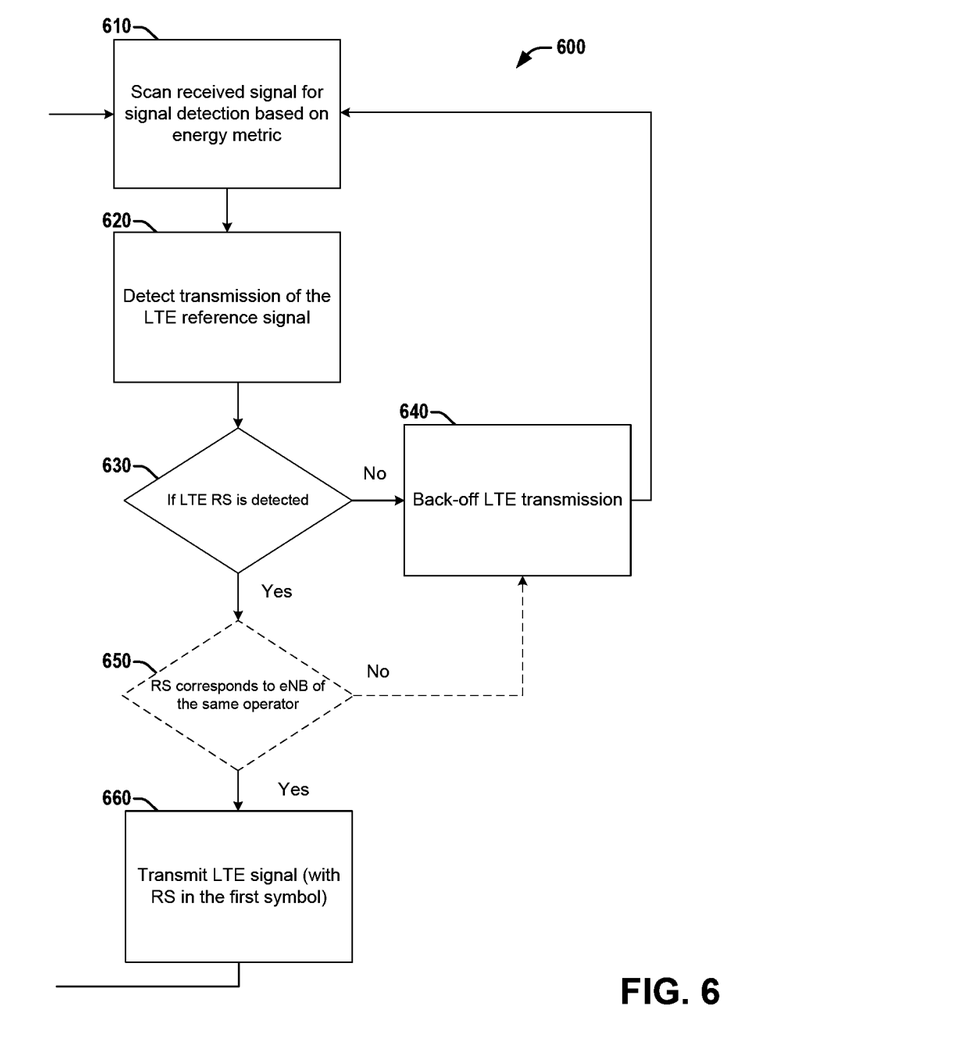
FIG. 6 is a flow diagram of an example method of enhanced LBT based on detection of LTE RSs according to various aspects described herein.

FIG. 6 illustrates a flow diagram of an example method 600 of enhanced LBT based on detection of LTE RSs according to various aspects described herein. In various aspects, method 600 can be implemented by an eNB. At 610, method 600 includes scanning one or more received signals in order to perform signal detection based at least in part on an energy detection metric. At 620, each received signal can be analyzed to determine whether the transmission comprises an LTE RS, such as one of a predefined set of LTE RSs. If, at 630, no LTE RS is detected, then the eNB can back-off the intended LTE transmission at 640. However, if an LTE RS was detected at 630, then an optional determination can be made as to whether the detected LTE RS corresponds to another eNB of the operator of the eNB implementing method 600. If not, then the eNB can back-off the intended LTE transmission at 640. If so, or if the determination at 630 was positive and the optional determination at 650 was not made, then an LTE signal can be transmitted comprising (e.g., in a first symbol) an LTE RS (e.g., of a set of predefined LTE RSs, which can be associated with the operator of the eNB implementing method 600)

In some embodiments, an RS signal may be a primary synchronization signal (PSS), a secondary synchronization signal (SSS), a cell specific reference signal (CRS), a channel state information reference signal (CSI-RS), or an uplink demodulation reference signal (DMRS). In some embodiments, modified PSS/SSS may be used. In embodiments, a Zadoff-Chu sequence that is used for PSS may be considered but with other roots comparing conventional PSS used in LTE, PSS/SSS with inversed mapping in frequency, or complex conjugated SSS. In some embodiments, a RS sequence may depend on Cell ID.

In some embodiments, a subset of a RS used by an operator on a given carrier may be explicitly provided to a eNB for detection. In this case, a eNB may be able to determine whether a transmission has occurred from a eNB of the same or another operator. In some embodiments, if another operator is occupying a channel, a eNB may back-off a transmission to ensure co-existence with other operators.

Figure 7:
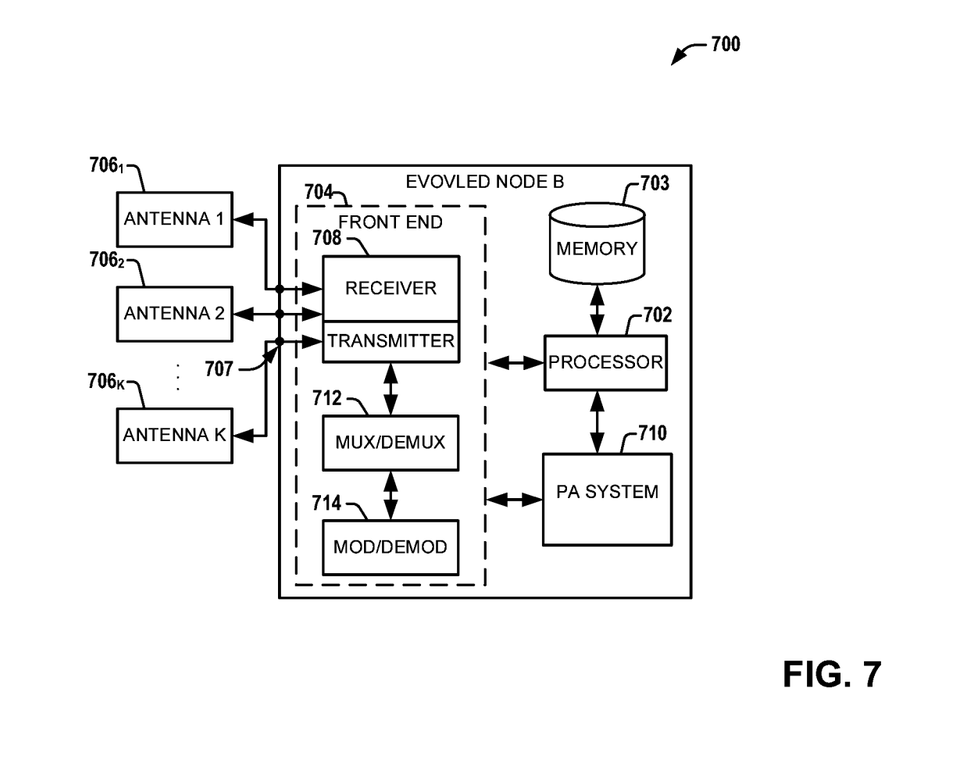
FIG. 7 is a block diagram illustrating an example UE useable in connection with various aspects described herein.

Referring to FIG. 7, illustrated is an exemplary eNB 700 that can be utilized with one or more aspects of the systems, methods, or devices facilitating communication with licensed assisted access described herein according to various aspects. The eNB 700, for example, comprises a digital baseband processor 702 that can be coupled to a data store or memory 703, a front end 704 (e.g., an RF front end, an acoustic front end, or the other like front end) and a plurality of antenna ports 707 for connecting to a plurality of antennas $706_1$ to $706_k$ (k being a positive integer). The antennas $706_1$ to $706_k$ can receive and transmit signals to and from one or more mobile devices such as UEs, etc., which can operate within a radio access network or other communication network generated via a network device. Although FIG. 7 illustrates eNB 700, the system of FIG. 7 can be employed with a variety of radio frequency (RF) devices for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device such as eNB 700 that can operate to communicate with a network and/or UEs or other devices according to one or more different communication protocols or standards.

The front end 704 can include a communication platform, which comprises electronic components and associated circuitry that provide for processing, manipulation or shaping of the received or transmitted signals via one or more receivers or transmitters 708, a mux/demux component 712, and a mod/demod component 714. The front end 704, for example, is coupled to the digital baseband processor 702 and the set of antenna ports 707, in which the set of antennas $706_1$ to $706_k$ can be part of the front end.

The eNB 700 can also include a processor 702 or a controller that can operate to provide or control one or more components of the eNB 700. For example, the processor 702 can confer functionality, at least in part, to substantially any electronic component within the eNB 700, in accordance with aspects of the disclosure. As an example, the processor 702 can be configured to execute, at least in part, executable instructions that facilitate enhanced listed-before-talk, in accordance with aspects described herein.

The processor 702 can operate to enable the eNB 700 to process data (e.g., symbols, bits, or chips) for multiplexing/demultiplexing with the mux/demux component 712, or modulation/demodulation via the mod/demod component 714, such as implementing direct and inverse fast Fourier transforms, selection of modulation rates, selection of data packet formats, inter-packet times, etc. Memory 703 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

The processor 702 is functionally and/or communicatively coupled (e.g., through a memory bus) to memory 703 in order to store or retrieve information necessary to operate and confer functionality, at least in part, to communication platform or front end 704 including the receiver 708, and the power amplifier (PA) system 710. While the components in FIG. 7 are illustrated in the context of an eNB, such illustration is not limited to user equipment but also extends to other wireless communication devices, such as other types of base stations, small cell, femtocell, macro cell, microcell, UEs, etc.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an apparatus configured to be employed within an Evolved NodeB (eNB), comprising a receiver circuit, a processor, and a transmitter circuit. The receiver circuit is configured to receive a set of one or more signals over a selected frequency band. The processor is operably coupled to the receiver circuit and configured to: determine a subset of the set of one or more signals via an energy detection metric; determine, for each signal of the subset, whether that signal comprises one of a plurality of long term evolution (LTE) reference signals (RSs) associated with an operator of the eNB; and implement a back-off procedure in response to a determination that at least one signal of the subset does not comprise one of the plurality of LTE RSs associated with the operator of the eNB. The transmitter circuit configured to transmit a transmission comprising a first RS of the plurality of LTE RSs in response to a determination that each signal of the subset comprises one of the plurality of LTE RSs associated with the operator of the eNB.

Example 2 includes the subject matter of example 1, wherein the first RS of the plurality of LTE RSs is a first symbol of the transmission.

Example 3 includes the subject matter of any variation of examples 1-2, including or omitting optional features, wherein the selected frequency band is an unlicensed frequency band.

Example 4 includes the subject matter of any variation of examples 1-3, including or omitting optional features, wherein the subset comprises the signals of the set of one or more signals with a signal energy greater than a threshold energy associated with the energy detection metric.

Example 5 includes the subject matter of any variation of examples 1-4, including or omitting optional features, wherein the processor being configured to determine, for each signal of the subset, whether that signal comprises one of a plurality of LTE RSs associated with the operator of the eNB comprises the processor being configured to: determine whether that signal comprises a LTE RS; and determine whether the LTE RS is associated with the operator of the eNB.

Example 6 includes the subject matter of any variation of examples 1-5, including or omitting optional features, wherein the processor being configured to determine, for each signal of the subset whether that signal comprises one of a plurality of LTE RSs associated with the operator of the eNB comprises the processor being configured to determine whether the plurality of LTE RSs associated with the operator of the eNB comprises a first transmitted symbol of that signal.

Example 7 includes the subject matter of any variation of examples 1-6, including or omitting optional features, wherein the processor being configured to implement the back-off procedure comprises the processor being configured to delay the transmission for a random period of time after the determination is made that each signal of the subset comprises one of the plurality of LTE reference signals RSs associated with the operator of the eNB.

Example 8 includes the subject matter of any variation of examples 1-7, including or omitting optional features, wherein the receiver circuit is further configured to receive configuration information that indicates the plurality of LTE RSs associated with the operator of the eNB.

Example 9 includes the subject matter of any variation of examples 1-8, including or omitting optional features, wherein the plurality of LTE RSs associated with the operator of the eNB comprise at least one of a Primary Synchronization Signal (PSS) signal, a Secondary Synchronization Signal (SSS) signal, or a Cell-Specific Reference Signal (CRS) signal.

Example 10 includes the subject matter of example 1, wherein the selected frequency band is an unlicensed frequency band.

Example 11 includes the subject matter of example 1, wherein the subset comprises the signals of the set of one or more signals with a signal energy greater than a threshold energy associated with the energy detection metric.

Example 12 includes the subject matter of example 1, wherein the processor being configured to determine, for each signal of the subset, whether that signal comprises one of a plurality of LTE RSs associated with the operator of the eNB comprises the processor being configured to: determine whether that signal comprises a LTE RS; and determine whether the LTE RS is associated with the operator of the eNB.

Example 13 includes the subject matter of example 1, wherein the processor being configured to determine, for each signal of the subset whether that signal comprises one of a plurality of LTE RSs associated with the operator of the eNB comprises the processor being configured to determine whether the plurality of LTE RSs associated with the operator of the eNB comprises a first transmitted symbol of that signal.

Example 14 includes the subject matter of example 1, wherein the processor being configured to implement the back-off procedure comprises the processor being configured to delay the transmission for a random period of time after the determination is made that each signal of the subset comprises one of the plurality of LTE reference signals RSs associated with the operator of the eNB.

Example 15 includes the subject matter of example 1, wherein the receiver circuit is further configured to receive configuration information that indicates the plurality of LTE RSs associated with the operator of the eNB.

Example 16 includes the subject matter of example 1, wherein the plurality of LTE RSs associated with the operator of the eNB comprise at least one of a Primary Synchronization Signal (PSS) signal, a Secondary Synchronization Signal (SSS) signal, or a Cell-Specific Reference Signal (CRS) signal.

Example 17 is a non-transitory machine readable medium comprising instructions that, when executed, cause an evolved NodeB (eNB) to: receive signals associated with a frequency band; scan the received signals based on an energy detection metric; determine, for each of the received signals, whether an energy of that received signal exceeds a threshold energy associated with the energy detection metric; determine, in response to a determination that the energy of at least one of the received signals exceeds the threshold energy, for all of the at least one of the received signals whether the received signal comprises one of a plurality of long term evolution (LTE) reference signal (RS) associated with an operator of the eNB; implement a back-off procedure in response to a determination that not all of the at least one of the received signals comprises one of the plurality of long term evolution (LTE) reference signals (RSs) associated with the operator of the eNB; and transmit an output signal comprising a selected RS of the plurality of LTE RSs associated with the operator of the eNB, in response to a determination that either the energy of none of the received signals exceeds the threshold energy or that each of the at least one of the received signals comprises one of the plurality of LTE RSs associated with the operator of the eNB.

Example 18 includes the subject matter of example 17, wherein the selected RS is based at least in part on one or more Primary Synchronization Signal (PSS) signals.

Example 19 includes the subject matter of example 17, wherein the selected RS is based at least in part on one or more Secondary Synchronization Signal (SSS) signals.

Example 20 includes the subject matter of example 17, wherein the selected RS is based at least in part on one or more Cell-Specific Reference Signal (CRS) signals.

Example 21 includes the subject matter of example 17, wherein the selected RS is based at least in part on one or more Channel State Information Reference Signal (CSI-RS) signals.

Example 22 includes the subject matter of example 17, wherein the selected RS is based at least in part on one or more Uplink Demodulation Reference Signal (Uplink DM-RS) signals.

Example 23 includes the subject matter of example 17, wherein the selected RS is based at least in part on a Cell Identity associated with the eNB.

Example 24 includes the subject matter of example 17, wherein the selected RS is based at least in part on at least one modified Primary Synchronization Signal (PSS) signal or at least one modified Secondary Synchronization Signal (SSS).

Example 25 includes the subject matter of example 24, wherein the at least one modified PSS signal or at least one modified SSS signal comprises a first modified PSS signal based on an alternative Zadoff-Chu root sequence.

Example 26 includes the subject matter of example 24, wherein the at least one modified PSS signal or at least one modified SSS signal comprises a first modified signal based on an inverse mapping in frequency.

Example 27 includes the subject matter of example 24, wherein the at least one modified PSS signal or at least one modified SSS signal comprises at least one complex conjugated SSS signal.

Example 28 is an Evolved NodeB (eNB), comprising a receiver circuit, a processor, and a transmitter circuit. The receiver circuit is configured to receive a set of signals over a frequency band. The processor is operably coupled to the receiver circuit and configured to: measure an energy of each signal of the set of signals; determine, for each signal of the set of signals, whether the energy of that signal exceeds a threshold value; in response to a determination that the energy of at least one signal of the set of signals exceeds the threshold value, determine whether each of the at least one signal of the set of signals comprises any reference signal (RS) of a set of RSs; and in response to a determination that any of the at least one signal does not comprise at least one RS of the set of RSs, implement a back-off procedure. The transmitter circuit is configured to transmit a transmission, in response to a determination either that the energy of each signal of the set of signals does not exceed the threshold value or that each of the at least one signal comprises at least one RS of the set of RSs.

Example 29 includes the subject matter of example 28, wherein the transmission comprises a selected RS of the set of RSs.

Example 30 includes the subject matter of example 29, wherein the selected RS is a first symbol of the transmission.

Example 31 includes the subject matter of example 28, wherein a first symbol of the transmission is not aligned with a subframe boundary.

Example 32 includes the subject matter of any variation of examples 28-31, including or omitting optional features, wherein the set of RSs comprise a set of RSs assigned to an operator of the eNB.

Example 33 includes the subject matter of example 28, wherein the set of RSs comprise a set of RSs assigned to an operator of the eNB.

Example 34 is an Evolved NodeB (eNB), comprising means for receiving, means for processing, and means for transmitting. The means for receiving is configured to receive a set of one or more signals over a selected frequency band. The means for processing is operably coupled to the means for receiving and configured to: determine a subset of the set of one or more signals via an energy detection metric; determine, for each signal of the subset, whether that signal comprises one of a plurality of long term evolution (LTE) reference signals (RSs) associated with an operator of the eNB; and implement a back-off procedure in response to a determination that at least one signal of the subset does not comprise one of the plurality of LTE RSs associated with the operator of the eNB. The means for transmitting is configured to transmit a transmission comprising a first RS of the plurality of LTE RSs in response to a determination that each signal of the subset comprises one of the plurality of LTE RSs associated with the operator of the eNB.

Example 35 is an Evolved NodeB (eNB), comprising means for receiving, means for processing, and means for transmitting. The means for receiving is configured to receive a set of signals over a frequency band. The means for processing is operably coupled to the means for receiving and configured to: measure an energy of each signal of the set of signals; determine, for each signal of the set of signals, whether the energy of that signal exceeds a threshold value; in response to a determination that the energy of at least one signal of the set of signals exceeds the threshold value, determine whether each of the at least one signal of the set of signals comprises any reference signal (RS) of a set of RSs; and in response to a determination that any of the at least one signal does not comprise at least one RS of the set of RSs, implement a back-off procedure. The means for transmitting is configured to transmit a transmission, in response to a determination either that the energy of each signal of the set of signals does not exceed the threshold value or that each of the at least one signal comprises at least one RS of the set of RSs.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within an Evolved NodeB (eNB), comprising:
a receiver circuit configured to receive a set of one or more signals over a selected frequency band;
a processor operably coupled to the receiver circuit and configured to:
determine a subset of the set of one or more signals via an energy detection metric;
determine, for each signal of the subset, whether that signal comprises one of a plurality of long term evolution (LTE) reference signals (RSs) associated with an operator of the eNB; and
implement a back-off procedure in response to a determination that at least one signal of the subset does not comprise one of the plurality of LTE RSs associated with the operator of the eNB; and
a transmitter circuit configured to transmit a transmission comprising a first RS of the plurality of LTE RSs in response to a determination that each signal of the subset comprises one of the plurality of LTE RSs associated with the operator of the eNB.

2. The apparatus of claim 1, wherein the first RS of the plurality of LTE RSs is a first symbol of the transmission.

3. The apparatus of claim 1, wherein the selected frequency band is an unlicensed frequency band.

4. The apparatus of claim 1, wherein the subset comprises the signals of the set of one or more signals with a signal energy greater than a threshold energy associated with the energy detection metric.

5. The apparatus of claim 1, wherein the processor being configured to determine, for each signal of the subset, whether that signal comprises one of a plurality of LTE RSs associated with the operator of the eNB comprises the processor being configured to:
determine whether that signal comprises a LTE RS; and
determine whether the LTE RS is associated with the operator of the eNB.

6. The apparatus of claim 1, wherein the processor being configured to determine, for each signal of the subset whether that signal comprises one of a plurality of LTE RSs associated with the operator of the eNB comprises the processor being configured to determine whether the plurality of LTE RSs associated with the operator of the eNB comprises a first transmitted symbol of that signal.

7. The apparatus of claim 1, wherein the processor being configured to implement the back-off procedure comprises the processor being configured to delay the transmission for a random period of time after the determination is made that each signal of the subset comprises one of the plurality of LTE reference signals RSs associated with the operator of the eNB.

8. The apparatus of claim 1, wherein the receiver circuit is further configured to receive configuration information that indicates the plurality of LTE RSs associated with the operator of the eNB.

9. The apparatus of claim 1, wherein the plurality of LTE RSs associated with the operator of the eNB comprise at least one of a Primary Synchronization Signal (PSS) signal, a Secondary Synchronization Signal (SSS) signal, or a Cell-Specific Reference Signal (CRS) signal.

10. A non-transitory machine readable medium comprising instructions that, when executed, cause an evolved NodeB (eNB) to:
receive signals associated with a frequency band;
scan the received signals based on an energy detection metric;
determine, for each of the received signals, whether an energy of that received signal exceeds a threshold energy associated with the energy detection metric;
determine, in response to a determination that the energy of at least one of the received signals exceeds the threshold energy, for all of the at least one of the received signals whether the received signal comprises one of a plurality of long term evolution (LTE) reference signal (RS) associated with an operator of the eNB;
implement a back-off procedure in response to a determination that not all of the at least one of the received signals comprises one of the plurality of long term evolution (LTE) reference signals (RSs) associated with the operator of the eNB; and
transmit an output signal comprising a selected RS of the plurality of LTE RSs associated with the operator of the eNB, in response to a determination that either the energy of none of the received signals exceeds the threshold energy or that each of the at least one of the received signals comprises one of the plurality of LTE RSs associated with the operator of the eNB.

11. The non-transitory machine readable medium of claim 10, wherein the selected RS is based at least in part on one or more Primary Synchronization Signal (PSS) signals.

12. The non-transitory machine readable medium of claim 10, wherein the selected RS is based at least in part on one or more Secondary Synchronization Signal (SSS) signals.

13. The non-transitory machine readable medium of claim 10, wherein the selected RS is based at least in part on one or more Cell-Specific Reference Signal (CRS) signals.

14. The non-transitory machine readable medium of claim 10, wherein the selected RS is based at least in part on one or more Channel State Information Reference Signal (CSI-RS) signals.

15. The non-transitory machine readable medium of claim 10, wherein the selected RS is based at least in part on one or more Uplink Demodulation Reference Signal (Uplink DM-RS) signals.

16. The non-transitory machine readable medium of claim 10, wherein the selected RS is based at least in part on a Cell Identity associated with the eNB.

17. The non-transitory machine readable medium of claim 10, wherein the selected RS is based at least in part on at least one modified Primary Synchronization Signal (PSS) signal or at least one modified Secondary Synchronization Signal (SSS).

18. The non-transitory machine readable medium of claim 17, wherein the at least one modified PSS signal or at least one modified SSS signal comprises a first modified PSS signal based on an alternative Zadoff-Chu root sequence.

19. The non-transitory machine readable medium of claim 17, wherein the at least one modified PSS signal or at least one modified SSS signal comprises a first modified signal based on an inverse mapping in frequency.

20. The non-transitory machine readable medium of claim 17, wherein the at least one modified PSS signal or at least one modified SSS signal comprises at least one complex conjugated SSS signal.

21. An Evolved NodeB (eNB), comprising:
a receiver circuit configured to receive a set of signals over a frequency band;
a processor operably coupled to the receiver circuit and configured to:

measure an energy of each signal of the set of signals;
determine, for each signal of the set of signals, whether the energy of that signal exceeds a threshold value;
in response to a determination that the energy of at least one signal of the set of signals exceeds the threshold value, determine whether each of the at least one signal of the set of signals comprises any reference signal (RS) of a set of RSs; and
in response to a determination that any of the at least one signal does not comprise at least one RS of the set of RSs, implement a back-off procedure; and
a transmitter circuit configured to transmit a transmission, in response to a determination either that the energy of each signal of the set of signals does not exceed the threshold value or that each of the at least one signal comprises at least one RS of the set of RSs.

22. The eNB of claim 21, wherein the transmission comprises a selected RS of the set of RSs.

23. The eNB of claim 22, wherein the selected RS is a first symbol of the transmission.

24. The eNB of claim 21, wherein a first symbol of the transmission is not aligned with a subframe boundary.

25. The eNB of claim 21, wherein the set of RSs comprise a set of RSs assigned to an operator of the eNB.

* * * * *